UNITED STATES PATENT OFFICE.

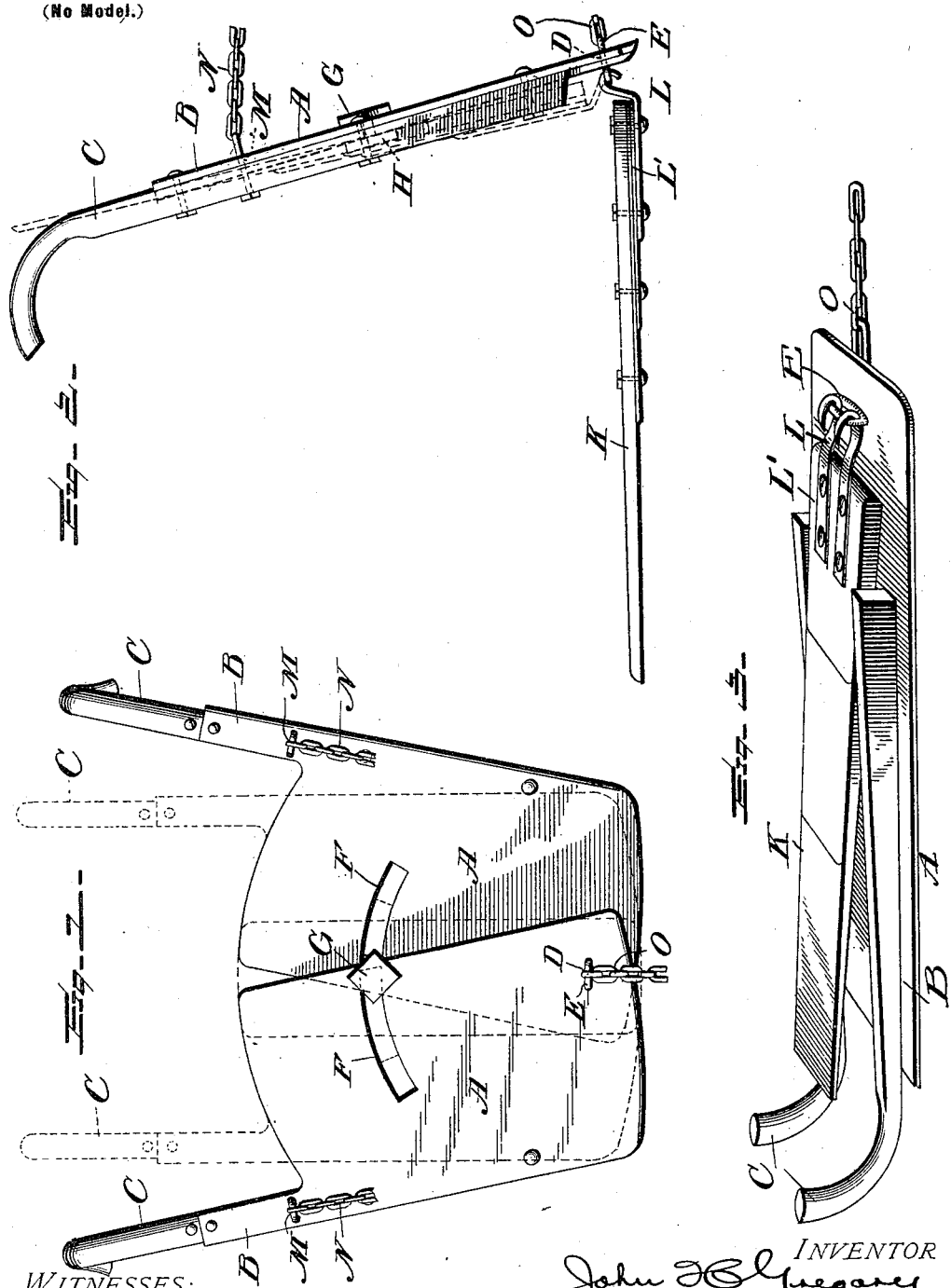

JOHN H. GREGORY, OF IONE, CALIFORNIA.

SCRAPER FOR CLEANING DITCHES OR TRENCHES.

SPECIFICATION forming part of Letters Patent No. 659,473, dated October 9, 1900.

Application filed July 11, 1900. Serial No. 23,225. (No model.)

*To all whom it may concern:*

Be it known that I, JOHN H. GREGORY, a citizen of the United States, residing at Ione, in the county of Amador and State of California, have invented certain new and useful Improvements in Scrapers for Cleaning Ditches or Trenches; and I do hereby declare the following to be a full, clear, and exact description of the invention, such as will enable others skilled in the art to which it appertains to make and use the same.

My invention relates to scrapers generally; but it has been designed with special reference to that class of scrapers adapted for cleaning ditches or trenches which have been dug for irrigation purposes.

The invention consists of the construction, arrangement, and combination of the several parts composing the scraper, as will be hereinafter more particularly described and then pointed out in the claims.

In order to enable those skilled in the art to which my invention pertains to make use of the same, I shall now proceed to describe the manner in which it can best be explained, understood, and carried into effect by reference to the accompanying drawings, in which—

Figure 1 is a front view of a scraper made in accordance with my invention, showing the blades expanded in full lines and in normal or closed position in dotted lines. Fig. 2 is a side elevation of the same. Fig. 3 is a view of the same turned upside down, showing the parts in folded position and more particularly the platform.

In the accompanying drawings, A A are the blades of the scraper, slightly overlapping one another and of any convenient or suitable shape or form. They are provided on their outer edge with extensions B B, (preferably made integral with the blades,) which extend upward a short distance beyond the upper edges of the scrapers. The handles C C, which extend down about midway the blades, are secured to the blades and their extensions by means of bolts or otherwise and are in practice so positioned upon the extensions B B as to allow the extensions to project a short distance at their outer edges beyond the boundary of the handles C C, as seen in dotted lines in the drawings. The blades A A are slotted or apertured at D near their lower inner edge, and a link E, 8-shaped or of any other suitable shape, is passed about midway through the said apertures D, (leaving the rings thereof projecting on opposite sides of the blades,) which secures the two blades together at that point and also serves as a pivot upon which they turn.

At or about the center or just to one side above the center of the blades A A are formed therein horizontally-arranged slots F F, which extend from near the center of to quite near the inner edges of the blades and are slightly curved, as shown in the drawings. Passing through these two horizontally-arranged slots F F is a headed bolt G, provided on one side with a nut H, so as to hold the blades together at that point and yet allow them to be freely folded together.

It will thus be seen and understood from the above-described construction and arrangement of the parts that upon moving the handles outwardly the scraper will be expanded, and by the reverse movement it will be contracted or in closed position, so that it can be adjusted for cleaning narrow as well as wide trenches or ditches.

A platform or stand K, adapted to be dragged on the ground and for the driver to stand on, of any suitable length and of a width to be folded between the handles C C, brings up in the rear of the scraper and is secured to the inner end or ring of link E by means of hooks L L, which allow it to have free play to adjust itself to any unevenness or obstructions in the ditch or trench when the scraper is in operation. The weight of the driver standing on the platform will hold the scraper down in place at all times and yet the same will yield to and pass over any uneven places or obstructions in the ditch. The platform or stand is made of tough stout wood and has its front thicker end, through which the bolts pass to secure the hooks L L in place, protected by a sheath or armor of iron or steel L′, suitably secured about the same. This sheath or armor may cover part or all of the exposed side of the platform, if desired.

A series of holes M are formed in the scraper along its opposite sides for the fastening devices, to which the upper draft-chains N may be connected, while the lower chain O is connected to the outer end or ring of link E. The chains are brought together at their ends and connected in any suitable way to the harness of the animal dragging the scraper.

A scraper made in accordance with my invention is strong and durable, can be folded so as to require but little space for shipment or storing when not in use, and is adjustable to fit narrow as well as wide ditches or trenches, and can be cheaply manufactured.

Having described my invention and the manner in which the same is or may be carried into effect, what I claim, and desire to secure by Letters Patent, is—

1. A scraper composed of two blades pivotally secured together near their lower inner edges, and adjustably secured together at a point above the pivot, whereby the blades can be expanded and contracted, and handles secured to said blades, substantially as and for the purposes hereinbefore set forth.

2. A scraper composed of two blades of suitable shape and construction overlapping one another, and adjustably secured together, a platform or stand secured to the rear thereof, and handles connected with said blades, substantially as and for the purposes hereinbefore set forth.

3. A scraper composed of two blades, overlapping each other, and pivotally secured together near their lower inner edges, and adjustably secured together at a point above the pivot, handles secured to said blades, and a platform or stand connected with said blades, substantially as and for the purposes hereinbefore set forth.

4. A scraper composed of two blades, overlapping one another, having upwardly-projecting extensions, and pivotally connected together near their inner lower edges, and adjustably connected together above the pivotal point, handles secured to said blades and their extensions, and an adjustable platform or stand connected to the rear of said blades, substantially as and for the purposes set forth.

In testimony whereof I affix my signature in presence of two witnesses.

JOHN H. GREGORY.

Witnesses:
JOHN ASBURY,
W. H. BADGER.